E. H. AHLANDER.
CLAMP AND HANGER.
APPLICATION FILED AUG. 23, 1915.
1,211,997.
Patented Jan. 9, 1917.
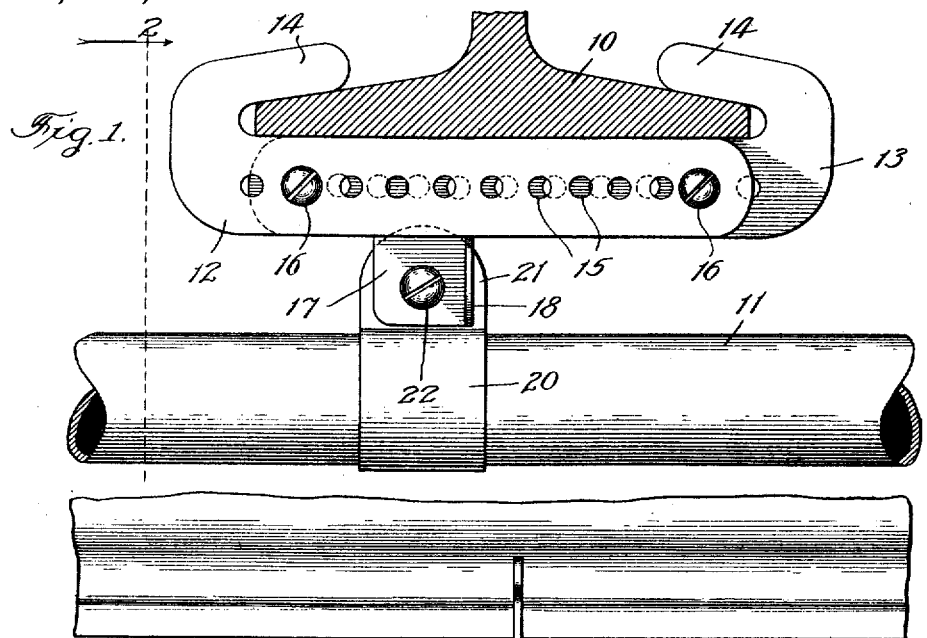
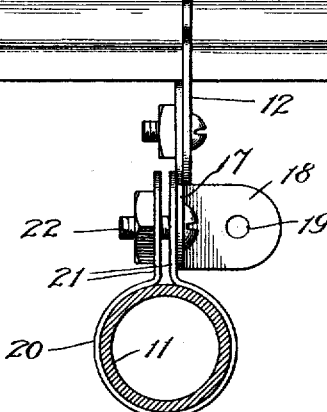
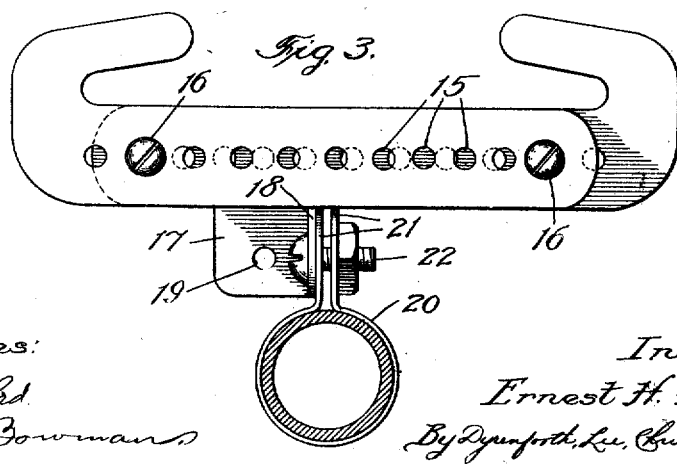
Witnesses:
Inventor:
Ernest H. Ahlander,
By Dyrenforth, Lee, Chritton & Wiles
Attys.

UNITED STATES PATENT OFFICE.

ERNEST H. AHLANDER, OF CHICAGO, ILLINOIS, ASSIGNOR TO THOMAS WRIGLEY COMPANY, OF CHICAGO, ILLINOIS, A CORPORATION OF ILLINOIS.

CLAMP AND HANGER.

1,211,997.  Specification of Letters Patent.  Patented Jan. 9, 1917.

Application filed August 23, 1915. Serial No. 46,905.

*To all whom it may concern:*

Be it known that I, ERNEST H. AHLANDER, a citizen of the United States, residing at Chicago, in the county of Cook and State of Illinois, have invented a new and useful Improvement in Clamps and Hangers, of which the following is a specification.

My invention relates to an improved form of clamp and hanger adapted for use in building construction and for the purpose of supporting pipes, conduit, or the like, from ceiling beams of I or T cross section.

The object of my invention is to provide a clamp and hanger of this form which will be simple in construction, easy of application, capable of a considerable range of adjustment to accommodate beams of different sizes, and capable of supporting a pipe, or the like, either in alinement with the beam or at an angle thereto. The means by which these objects are attained from the use of my invention will be understood from the following description of one embodiment of the invention and from the accompanying drawings which are illustrative thereof.

In the drawings, Figure 1 is a cross section of the lower portion of a T or I-beam, showing the manner of applying my clamp thereto and the manner in which the pipe is supported from the clamp, Fig. 2 is a section on the line 2 of Fig. 1, and Fig. 3 is a front elevation of the clamp and hanger and showing a pipe supported at right angles thereto.

In the drawing the numeral 10 designates the lower portion of an I or T-beam and the numeral 11 designates a pipe member which it is designed to support from the said T or I-beam substantially at right angles thereto.

My improved clamp and hanger for supporting the pipe in the position shown consists of a pair of conjugate clamp members 12 and 13, each of which has return-bent ends 14 which are adapted to embrace the edges of the beam portion 10, and are suitably inclined for this purpose. The body portions of the members 12, 13 are of such length as to overlap one another as shown in Fig. 1, and the overlapping ends are preferably provided with a series of unequally spaced perforations 15. The number and arrangement of these perforations is such that the clamp members 12, 13 may be adjusted longitudinally with respect to one another in a series of very small steps and in each step of adjustment at least one perforation at each end of a clamp member will register with a perforation in the conjugate clamp member, whereby locking bolts or screws 16 may be passed through the registering perforations to secure the parts in their adjusted position. By means of the adjustment permitted by the series of apertures 15 the clamp members 12, 13 may be extended or contracted to adapt them for I or T-beams of various sizes and throughout the range commonly met with in building construction.

In order to support a pipe or conduit from the clamp formed by the members 12 and 13 one of these members is provided with a hanger portion to which a clip or strap adapted to support the pipe member may be secured. In the drawing this hanger member is shown as a depending lug 17 formed integrally with the clamp member 12 and carrying also a wing or arm 18 which is preferably extended at right angles to the plane of the clamp. The hanger 17 and its wing 18 are each perforated as shown at 19 in the drawings. The pipe member 11 may then be hung from the clamp by means of a strap or clip, such as the clip 20, which embraces the pipe 11 and has out-turned ears 21 suitably perforated to permit a securing bolt 22 to be passed therethrough and through the aperture 19 of the lug 17.

The clamp and hanger member of the form illustrated in the drawings may readily be constructed of stamped or pressed sheet metal and when so constructed will be found to be low enough in price to be commercially adaptable for this service and will at the same time possess ample strength.

If it is desired to secure the pipe 11 in a position parallel to the line of the beam 10, as is illustrated in Fig. 3, the ears 21 of the strap 20 will be secured to the outstanding wing 18. It will further be noted that if it is desired to secure the pipe at any other angle to the beam 10, the wing 18 when constructed in the preferred manner as an integral part of the clamp 12 and lug 17 may readily be bent to the desired angle at the time the clamp is installed.

While I have shown and described in considerable detail one specific embodiment of my invention, it is to be understood that such showing and description is illustrative only and for the purpose of making my invention more clear and that I do not regard the invention as limited to these details nor to any of them, except in so far as I have included such limitations within the terms of the following claims, in which it is my intention to claim all novelty inherent in my invention as broadly as is possible in view of the prior art.

What I claim is—

1. A clamp and hanger of the type described and comprising conjugate clamp members adapted to be secured together to embrace the edges of a beam, a depending hanger formed on one of said clamp sections and having a wing and extending at an angle thereto, whereby the pipe may be supported from said hanger or said wing.

2. A clamp and hanger of the type described and comprising conjugate clamp members formed of sheet metal and having their opposite ends return bent in the plane of the sheet to embrace the edges of a beam, and having their adjacent ends overlapping, means for securing said overlapping ends to one another in adjusted positions, a hanger member formed on and depending from one of said overlapping ends and having a perforation therein adapting it to support a pipe strap, and a wing on said hanger and extending at an angle thereto, said wing being also perforated to adapt it to support a pipe strap.

ERNEST H. AHLANDER.

Witnesses:
L. HEISLAR,
A. C. FISCHER.

Copies of this patent may be obtained for five cents each, by addressing the "Commissioner of Patents, Washington, D. C."